April 16, 1968   KOZO SHIWAKU   3,377,879
MEANS FOR APPLYING ROLLING CONTACT TORQUE
TRANSMISSION TO WORM GEARING
Filed April 15, 1966

United States Patent Office — 3,377,879
Patented Apr. 16, 1968

3,377,879
MEANS FOR APPLYING ROLLING CONTACT TORQUE TRANSMISSION TO WORM GEARING
Kozo Shiwaku, 1034 3-chome, Kamiuma-machi, Setagaya-ku, Tokyo-to, Japan
Filed Apr. 15, 1966, Ser. No. 542,798
Claims priority, application Japan, Apr. 17, 1965, 40/22,680
2 Claims. (Cl. 74—425)

ABSTRACT OF THE DISCLOSURE

A worm gearing assemblage for applying a rolling contact torque transmission between a worm and a worm gear in which the helical thread of the worm is provided with a groove having a plurality of balls disposed therein and which balls are held in rolling contact with the meshed teeth of the worm gear. The worm is formed with an internal passageway extending axially thereof for receiving the balls and guide tubes join the respective ends of the groove and the passageway for providing a circulation path for the balls.

---

Figure 1:
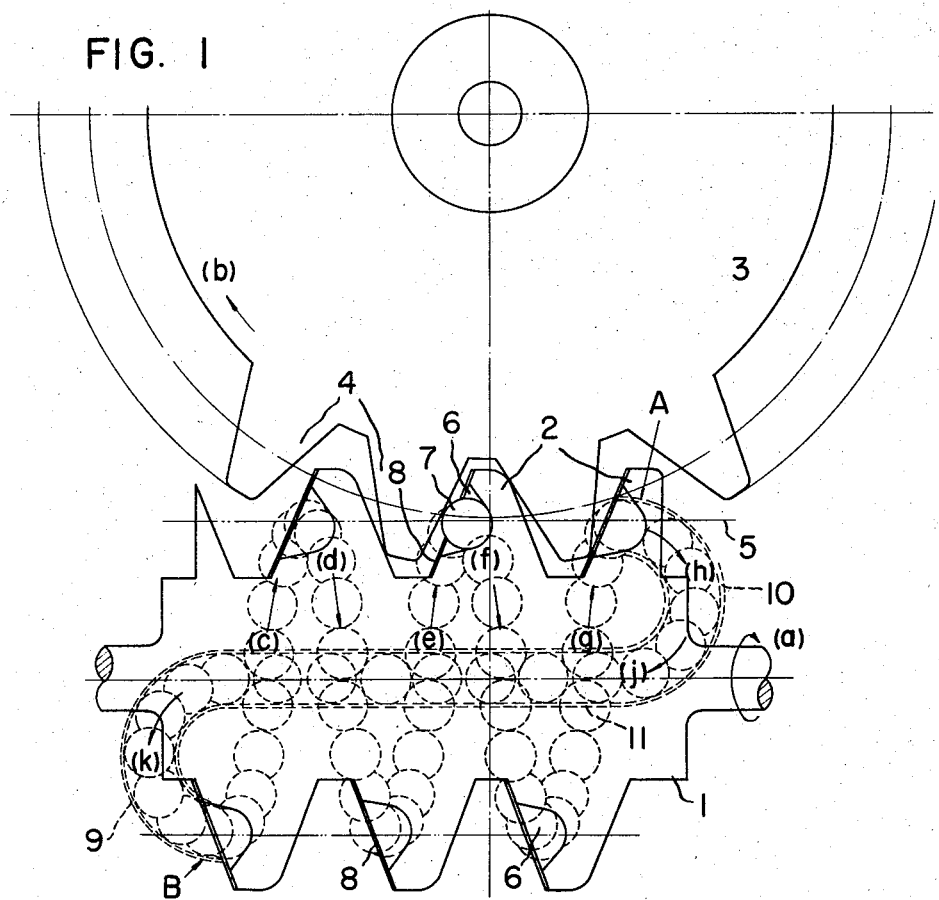

This invention relates to rolling contact means and to motion and torque transmission devices of the so-called swash plate type. More particularly, the invention concerns a new means for applying rolling contact motion or torque transmission to worm gearing.

As is well known, conventional worm gearing of the rubbing contact type has the great disadvantage of extremely low efficiency in transmitting motion or power particularly at low speeds.

A generally accepted equation for calculating the transmission efficiency $e$ of the rubbing contact type worm gearing is as follows according to Marks, Lionel S.: "Mechanical Engineers' Handbook," 5th edition, McGraw-Hill Book Company, Inc., New York, p. 226, for the case where the driving and driven shafts are perpendicular to each other.

$$e = \tan c / \tan(c+a)$$
$$= \left(1 - \frac{pf}{2\pi r}\right) \Big/ \left(1 + \frac{2\pi r f}{f}\right) \quad (1)$$

where:
$c$ is the helical angle of the worm wheel, or the lead angle of the worm;
$p$ is the lead or pitch of the worm thread;
$r$ is the mean radius of the worm; and
$f$ is the "coefficient of friction" between the contact surfaces of the worm and gear.

Typical values of $f$ are as follows:

| | | | |
|---|---|---|---|
| Rubbing speed of worm, f.p.m. | 100 | 200 | 300 |
| $f$ of phosphor-bronze wheel, polished steel worm | 0.054 | 0.045 | 0.039 |

As one example, transmission efficiency $e$ will be calculated under the conditions of:
$f=0.054$, corresponding to a rubbing speed of 100 f.p.m.; $p=1$ inch; and $r=2.5$ inches,
in which case, $$e = \left(1 - \frac{1 \times 0.054}{2\pi \times 2.5}\right) \Big/ \left(1 + \frac{2\pi \times 2.5 \times 0.054}{1}\right)$$
$$= (1 - 0.00345)(1 + 0.847)$$
$$\doteqdot 54 \text{ percent}$$

It will be apparent that if balls were to be interposed between the contact surfaces of this worm gearing to accomplish a rolling contact power transmission, the friction would be reduced to an extremely low value.

According to Goodman's tests, the coefficient of friction in deep groove ball bearings ranged between 0.0014 to 0.0025 depending on the load. When, from this result, 0.0020 is taken as a mean value and inserted for $f$ in Equation 1, the following transmission efficiency is obtained.

$$e = \left(1 - \frac{1 \times 0.0020}{2\pi \times 2.5}\right) \Big/ \left(1 + \frac{2\pi \times 2.5 \times 0.0020}{1}\right)$$
$$= (1 - 0.00013)(1 + 0.0314)$$
$$\doteqdot 97\%$$

That is, the transmission efficiency can be increased remarkably by using a rolling contact instead of a rubbing contact.

An object of the present invention is to provide, on the basis of the above consideration, worm gearing means of extremely high transmission efficiency.

Another object of the invention is to provide worm gearing means in which the power transmission direction can be reversed whereby not only a speed reduction but also a speed increase can be realized.

According to the present invention, briefly stated, there is provided, in the transmission of torque by worm gearing means consisting essentially of a worm meshed with a worm gear, the concept which comprises transmitting torque between the worm and the worm gear via a plurality of balls circulating through at least one circulation path permitting the free passage therethrough of the balls and each comprising a ball groove provided in the helical thread of the worm and adapted to hold the balls in rolling contact with the meshed teeth of the worm gear, an internal ball passageway through the interior of the worm, and guide tubes joining the respective ends of the ball groove and the internal ball passageway for constituting the ball circulation path.

According to the present invention, there is further provided a rolling contact system for transmitting torque between the worm and the gear of worm gearing means.

The nature, principle, and details of the invention will be more clearly apparent from the following detailed description with respect to a preferred embodiment of the invention as illustrated in the accompanying drawing, in which like parts are designated by like reference numerals and characters.

Figure 2:
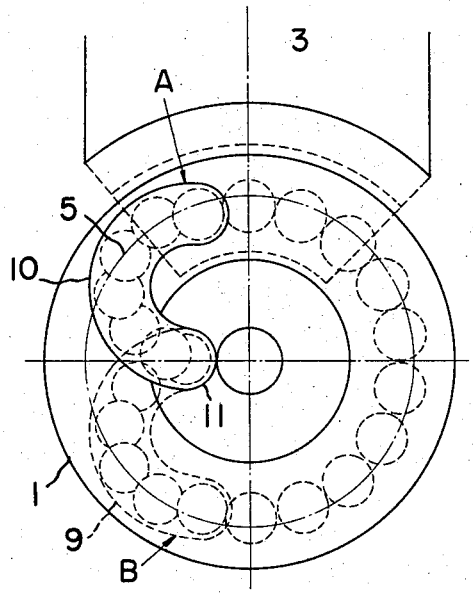
Figure 3:
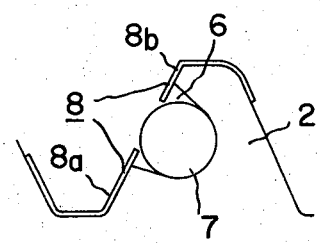

In the drawing:
FIGURE 1 is a fragmental view in the axial direction of the worm wheel of a worm and worm wheel mechanism embodying the invention;
FIGURE 2 is a view in the axial direction of the worm of the mechanism shown in FIGURE 1; and
FIGURE 3 is a fragmentary sectional view in a direction perpendicular to the worm axis showing in detail one example of means for retaining balls on the contact surface of the worm thread shown in FIGURES 1 and 2.

Referring to the drawing, the gearing mechanism shown therein comprises, essentially, a worm 1 having a helical thread 2, a gear (worm wheel) 3 having teeth 4 in mesh with the thread 2, and a rolling contact system as described below.

The helically shaped thread 2 is provided along a helical path in the vicinity of its pitch line with a groove 6 in which a large number of balls 7 are alined in a single helical row and are prevented from leaving the groove 6 perpendicularly thereto by a ball retainer 8 firmly secured on and along the surface of the thread 2. The ball retainer 8 consists of inner and outer parts 8a and 8b disposed as shown in FIGURE 3 with the respective edges thereof overhanging the rims on the side of the groove 6 but leaving a slit or gap therebetween for the protrusion of a part of each ball 7 outwardly from the groove 6 and beyond the retainer parts 8a and 8b.

Thus, in one sense, the mechanism may be considered to be the equivalent in effect of a conventional worm and gear mechanism having a large backlash and with the balls disposed to protrude into the gap due to the backlash between the parts in mesh.

In accordance with the helical path of the ball groove 6, the balls 7 also assume a helical arrangement. At the two ends of the thread 2 denoted A and B, the ends of the ball groove 6 respectively communicate with the ends of curved guide tubes 10 and 9, with the other ends thereof communicating with the respective ends of an internal tube 11 formed in and extending axially of the interior of the worm 1, Thus, the ball groove 6, the guide tube 10, the internal tube 11, and the guide tube 9 constitute an endless, closed path for the circulation of the balls 7.

Accordingly, when the worm 1 is rotated in the direction indicated by arrow (a), the balls 7 as a ball group move along the ball groove 6 in the successive path indicated by arrows (c), (d), (e), (f), and (g) while forcing the teeth 4 of the worm gear 3 in the direction of arrow (b).

From the end of the ball groove 6, that is, from the righthand end A (as viewed in FIGURE 1) of the thread 2, the balls 7 successively flow or move into the guide tube 10 to flow along the path indicated by arrows (h) and (j) and enter the internal tube 11. From the lefthand end of the internal tube 11, the balls pass through the guide tube 9 as shown by arrow (k) and passing by the lefthand end B of the thread 2 return to the ball groove 6.

Thus, during the operation of the worm and worm gear mechanism, the balls 7, as a group, are caused as they circulate along the ball groove 6 to push against and drive the gear teeth 4 of the worm gear 3 whenever these are encountered thereby driving the gear 3.

It will be apparent that by the present construction of the worm and worm gear mechanism as described above, the transmission efficiencies of various worm gearing mechanisms can be remarkably increased. Moreover, lubrication of the moving parts of the mechanisms is greatly facilitated by the circulatory movement of the balls.

Furthermore, the extremely high transmission efficiency afforded by the present invention gives rise to another advantageous feature whereby the path of power or torque transmission is made reversible. That is, the gear can be used as a driving member to drive the worm whereby the mechanism can be used as a speed increasing device in certain applications.

While the foregoing description has been set forth with respect to a particular example wherein a single row of balls is used on only one flank or face of the worm thread, various other alternative constructional arrangements are possible according to the invention. For example, identical ball circulation systems can be provided on the two sides of the worm thread in cases where the gear is to be rotatable in both the clockwise and counterclockwise directions. As another example, two or more helical rows of ball circulation systems can be provided on each flank of the worm thread. In still other instances, the rolling contact means can be applied to doubled-threaded worms and worm wheel combinations.

Accordingly, it should be understood that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What I claim is:
1. A worm gearing for applying a rolling contact torque transmission thereto including a worm gear, a worm having a helical thread adapted to mesh with the teeth of the worm gear, at least one flank of the helical thread being provided with a continuous groove therein, a plurality of balls positioned in the groove, means retaining the balls in the groove for holdnig the balls in rolling contact with the teeth of the worm gear, said worm having a ball receiving passageway extending axially of the interior thereof, and guide tubes connecting the respective ends of the continuous groove and the pasageway thereby providing a closed circulation path for the balls.

2. The worm gearing as claimed in claim 1 in which the ball retaining means includes inner and outer components extending along said one flank of the helical thread and having a free edge overhanging the mouth of the groove, and said free edges being spaced apart a distance sufficient to allow a portion of the periphery of each ball to project beyond said one flank.

References Cited
UNITED STATES PATENTS

| | | | |
|---|---|---|---|
| 657,349 | 9/1900 | Jones | 74—458 |
| 731,527 | 6/1903 | Wagner | 74—458 |
| 1,347,802 | 7/1920 | Botts | 74—458 |
| 2,404,378 | 7/1946 | Hoffar | 74—458 |
| 2,520,784 | 8/1950 | Schlicksupp | 74—458 |
| 2,664,760 | 1/1954 | Booth | 74—458 |

FOREIGN PATENTS

| | | |
|---|---|---|
| 558,710 | 5/1923 | France. |

DONLEY J. STOCKING, *Primary Examiner.*

LEONARD H. GERIN, *Examiner.*